(12) United States Patent
Shi et al.

(10) Patent No.: US 11,044,278 B2
(45) Date of Patent: Jun. 22, 2021

(54) TRANSCODING CAPABILITY CONFIGURATION METHOD AND DEVICE AND COMPUTER STORAGE MEDIUM

(71) Applicant: Tencent Technology (Shenzhen) Company Limited, Shenzhen (CN)

(72) Inventors: Yongfang Shi, Shenzhen (CN); Anlin Gao, Shenzhen (CN); Xunan Mao, Shenzhen (CN); Chenchen Gu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 13 days.

(21) Appl. No.: 16/547,370

(22) Filed: Aug. 21, 2019

(65) Prior Publication Data

US 2019/0379707 A1 Dec. 12, 2019

Related U.S. Application Data

(63) Continuation of application No. PCT/CN2018/092095, filed on Jun. 21, 2018.

(30) Foreign Application Priority Data

Jul. 3, 2017 (CN) .......................... 201710532551.6

(51) Int. Cl.
*H04N 7/12* (2006.01)
*H04L 29/06* (2006.01)
*H04N 19/40* (2014.01)

(52) U.S. Cl.
CPC ........ *H04L 65/1059* (2013.01); *H04L 65/601* (2013.01); *H04N 19/40* (2014.11)

(58) Field of Classification Search
CPC ... H04L 65/1059; H04L 65/601; H04L 69/24; H04L 65/4084; H04L 65/602;
(Continued)

(56) References Cited

U.S. PATENT DOCUMENTS 8,842,159 B2   9/2014 Lu et al.
2002/0143975 A1  10/2002 Kimura et al.
(Continued)

FOREIGN PATENT DOCUMENTS

CN   101185335 A   5/2008
CN   101588252 A   11/2009
(Continued)

OTHER PUBLICATIONS

Tencent Technology, ISRWO, PCT/CN2018/092095, dated Sep. 10, 2018, 6 pgs.
(Continued)

*Primary Examiner* — Richard T Torrente
(74) *Attorney, Agent, or Firm* — Morgan, Lewis & Bockius LLP

(57) ABSTRACT

A transcoding capability configuration method that includes: separately obtaining capability information reported by at least two terminals, where the capability information includes first transcoding capability data and a service type of a service executed by the at least two terminals, and the at least two terminals belong to a same service group; determining, based on the first transcoding capability data and the service type of each of the at least two terminals, second transcoding capability data satisfying the at least two terminals; and sending the second transcoding capability data to each of the at least two terminals, so that each terminal configures a transcoding parameter based on the second transcoding capability data.

11 Claims, 7 Drawing Sheets

(58) Field of Classification Search
CPC ....... H04L 65/607; H04L 1/00; H04L 1/0027; H04L 1/0014; H04L 1/0009; H04N 19/40; H04N 21/2343; H04N 7/15
See application file for complete search history.

(56) References Cited

U.S. PATENT DOCUMENTS

| | | |
|---|---|---|
| 2008/0303889 A1 | 12/2008 | Barry et al. |
| 2013/0208075 A1* | 8/2013 | Lu .......................... H04N 7/152 348/14.02 |
| 2018/0007400 A1* | 1/2018 | Chen .................. H04N 21/2343 |

FOREIGN PATENT DOCUMENTS

| | | |
|---|---|---|
| CN | 102098553 A | 6/2011 |
| CN | 102137093 A | 7/2011 |
| CN | 102893603 A | 1/2013 |
| CN | 103166983 A | 6/2013 |
| CN | 103702063 A | 4/2014 |
| CN | 103731232 A | 4/2014 |
| CN | 106506444 A | 3/2017 |

OTHER PUBLICATIONS

Tencent Technology, IPRP, PCT/CN2018/092095, dated Jan. 7, 2020, 5 pgs.

* cited by examiner

TRANSCODING CAPABILITY CONFIGURATION METHOD AND DEVICE AND COMPUTER STORAGE MEDIUM

CROSS-REFERENCE TO RELATED APPLICATIONS

This application is a continuation application of PCT/CN2018/092095, entitled "TRANSCODING CAPABILITY CONFIGURATION METHOD AND DEVICE AND COMPUTER STORAGE MEDIUM" filed on Jun. 21, 2018, which claims priority to Chinese Patent Application No. 201710532551.6, entitled "TRANSCODING CAPABILITY CONFIGURATION METHOD AND DEVICE AND COMPUTER STORAGE MEDIUM" filed on Jul. 3, 2017, both of which are incorporated by reference in their entirety.

FIELD OF THE TECHNOLOGY

The present disclosure relates to transcoding technologies, and specifically, to a transcoding capability configuration method, a device, and a computer storage medium.

BACKGROUND OF THE DISCLOSURE

In recent years, as bandwidth is improved and mobile Internet develops, there are more video-oriented multimedia applications. A codec (CODEC, COder-DECoder) is a program or a device supporting video and audio compression (CO) and decompression (DEC), and can encode an original video signal to a binary data file in a particular format and can decode the data file.

SUMMARY

According to a first aspect of the present disclosure, a transcoding capability configuration method is performed at a transcoding capability configuration device. The method includes:

separately obtaining transcoding capability information reported by at least two terminals, where the capability information includes first transcoding capability data and a service type of a service executed by the at least two terminals, and the at least two terminals belong to a same service group;

determining, based on the first transcoding capability data and the service type of each of the at least two terminals, second transcoding capability data satisfying the at least two terminals; and sending the second transcoding capability data to each of the at least two terminals, so that each terminal configures a transcoding parameter based on the second transcoding capability data and starts the service using the transcoding parameter.

According to a second aspect of the present disclosure, a transcoding capability configuration device has one or more processors, memory coupled to the one or more processors and a plurality of programs stored in the memory that, when executed by the one or more processors, cause the transcoding capability configuration device to perform the aforementioned transcoding capability configuration method.

According to a third aspect of the present disclosure, a non-transitory computer readable storage medium stores a plurality of machine readable instructions in connection with a transcoding capability configuration device having one or more processors. The plurality of machine readable instructions, when executed by the one or more processors, cause the transcoding capability configuration device to perform the aforementioned transcoding capability configuration method.

DESCRIPTION OF EMBODIMENTS

The present disclosure is further described in detail below with reference to the accompanying drawings and specific embodiments.

Figures 1, 2:
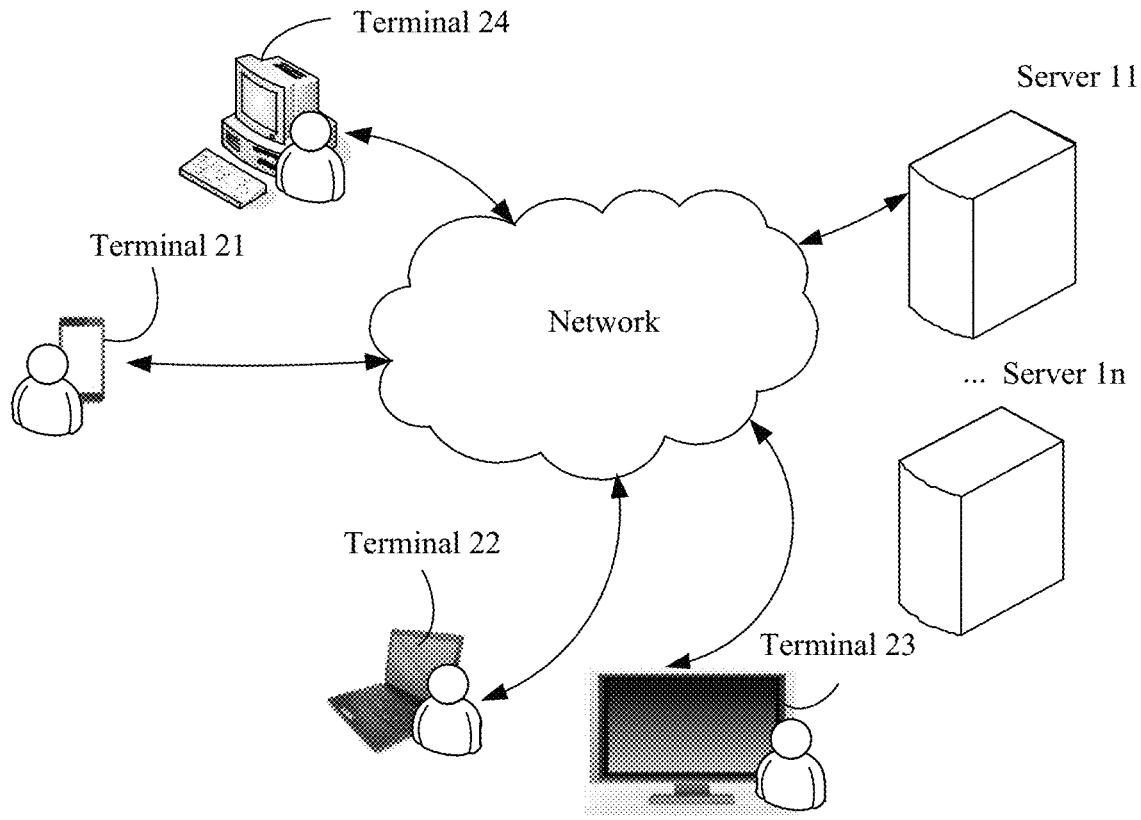
FIG. 1 is a schematic architectural diagram of an application of a transcoding capability configuration solution according to an embodiment of the present disclosure.
FIG. 2 is a schematic flowchart 1 of a transcoding capability configuration method according to an embodiment of the present disclosure.

FIG. 1 is a schematic architectural diagram of an application of a transcoding capability configuration solution according to this embodiment of the present disclosure, and a schematic diagram of hardware entities that perform information exchange according to this embodiment of the present disclosure. FIG. 1 includes: a server 11 to a server 1n and a terminal 21 to a terminal 24. The terminal 21 to the terminal 24 may perform, through a wired network or a wireless network, information exchange with the server. The terminal 21 to the terminal 24 include a mobile phone, a desktop computer, a notebook computer, an integrated computer, and the like. In an implementation, the server 11 to the server 1n include a first-class server. The first-class server may be referred to as a data server, and the data server is configured to transmit video data to the terminal, where a plurality of video-class applications may be run in the terminal device. The applications may be configured to send and/or receive video data. The first-class server may be the data server to which a video-type application run in the terminal device belongs. Terminal devices connected to the first-class server to which same video-type applications belong, or at least two terminal devices performing the same service are classified as terminal devices of a same service group. For example, a terminal device 1 makes a one-to-one video call with a terminal 2, and the terminal device 1 and the terminal device 2 form a group of terminal devices. The server 11 to the server 1*n* further include a second-class server, and the second server may be used as a transcoding capability configuration device in the embodiments, configured to make information exchange with a terminal device to obtain capability information sent by the terminal device. A transcoding parameter is negotiated based on transcoding capability data and a service type included in the obtained capability information, to determine transcoding capability data supported by each terminal in each group of terminals and deliver the transcoding capability data to each terminal of a corresponding service group, so that a transcoding configuration parameter is configured.

The foregoing example in FIG. 1 is only an example of a system architecture in this embodiment of the present disclosure. This embodiment of the present disclosure is not limited to the system architecture shown in FIG. 1. Based on the system architecture, various embodiments of the present disclosure are provided.

An embodiment of the present disclosure provides a transcoding capability configuration method. FIG. 2 is a schematic flowchart 1 of a transcoding capability configuration method according to an embodiment of the present disclosure. As shown in FIG. 2, the method includes:

Step 101: Separately obtain transcoding capability information reported by at least two terminals, where the capability information includes first transcoding capability data and a service type of a service executed by the at least two terminals, and the at least two terminals belong to a same service group.

Step 102: Determine, based on the first transcoding capability data and the service type of each of the at least two terminals, second transcoding capability data satisfying the at least two terminals.

Step 103: Send the second transcoding capability data to each of the at least two terminals, so that each terminal configures a transcoding parameter based on the second transcoding capability data.

In this embodiment, the transcoding capability configuration method is applied to the transcoding capability configuration device. The transcoding capability configuration device is configured to select and configure the coding scheme and/or the decoding scheme of the terminal, and specifically, to configure the coding scheme and/or the decoding scheme of the terminal that are in the same service group after negotiation. As an example, the transcoding capability configuration device specifically may be implemented by a server configured to configure a transcoding parameter, and the server is used as an execution entity for description in all the following embodiments.

In this embodiment, the server separately obtains capability information reported by the at least two terminals belonging to the same service group, and the capability information includes first transcoding capability data and a service type, where the service type includes a service type that only needs video encoding, a service type that only needs video decoding, a service type that needs video encoding and video decoding, or the like. The foregoing service type is carried in the capability information reported by the terminal, and the service type also represents a service type of a service group to which at least two terminals belong, that is, the service type performed by the at least two terminals may be the same. As an example, in the application scenario of video monitoring, the service type is a service type of video encoding; in the application scenario of video on-demand, the service type is a service type of video decoding; in the application scenario of live streaming, where the live streaming may be understood as multi-user interactive socializing manner using audio and/or video technology based on a live-streaming platform, the service type may be a service type of multimedia data encoding and decoding, and the multimedia data may include video data and/or audio data; and in the application scenario of the Voice over Internet Protocol (VoIP, Voice over Internet Protocol), the service type needs encoding and decoding at the same time, and in particular, for a multi-user video call, simultaneous decoding of multichannel data is further required, and terminals in a same service group have a same service type.

In this embodiment, the server determines, based on the first transcoding capability data and the service type of the at least two terminals, the second transcoding capability data satisfying each terminal. The second transcoding capability is the transcoding capability that satisfies the service type and that is supported by each of the at least two terminals. Specifically, after receiving the first transcoding capability data reported by the first terminal of the at least two terminals belonging to the same service group, the server creates a specific space, and after receiving the first transcoding capability data supported by all terminals in the service group, negotiates transcoding capability data with reference to the service types of the service group, that is, the service type included in the capability information of each terminal. In actual application, the capability information obtained by the server may include a group identifier, and based on the group identifier, whether the obtained transcoding capability data belongs to that of the same service group may be determined. The capability information obtained by the server may further include a quantity of terminals in the service group, so that whether the capability information supported by all terminals in the service group has been received may be determined based on the quantity of terminals.

In this embodiment, the server selects, based on the service type, second transcoding capability data that is related to the service type and that satisfies the capability of each of the at least two terminals. Specifically, if the service type is only a service type of video encoding, the server selects the second transcoding capability data that is related to the video-encoding type and that satisfies the encoding capability of each of the at least two terminals; if the service type is only a service type of video decoding, the server selects the second transcoding capability data that is related to the video-decoding type and that satisfies the decoding capability of each of the at least two terminals; and if the service type is a service type of video encoding and video decoding, the server selects the second transcoding capability data that is related to the video-encoding and video-decoding type and that satisfies the encoding and decoding capabilities of each of the at least two terminals.

In an implementation, the determining, based on the first transcoding capability data and the service type of each of the at least two terminals, second transcoding capability data satisfying each terminal includes: determining, based on the first transcoding capability data and preset transcoding capability data of each of the at least two terminals, the second transcoding capability data satisfying each terminal and satisfying the service type.

Specifically, preset transcoding capability data may be preconfigured in the server, the preset transcoding capability data is transcoding capability parameters preferably supported by terminals of common models. Some transcoding capabilities are supported by terminals, but the efficiency is low or it is prone to error. That a transcoding capability is supported is indicated in the transcoding capability data reported by the terminal, but that the transcoding capability is not supported is indicated in the preset transcoding capability data. Based on this, in this embodiment, the server determines, based on the first transcoding capability data reported by the terminal and the preset transcoding capability data, the second transcoding capability data that is supported by each terminal and that conforms to the service type, where the preset transcoding capability data may be automatically configured according to the long-term operation, or manually configured by operators.

Further, the determining the second transcoding capability data satisfying each terminal and satisfying the service type includes: when at least two pieces of transcoding capability data satisfy each terminal and satisfy the service type, determining to select the second transcoding capability data from the at least two pieces of transcoding capability data based on a preset decision rule, where the second transcoding capability data enables quality of communication between the at least two terminals to satisfy a preset requirement.

Specifically, there may be more than one piece of transcoding capability data that satisfies the service type and that satisfies each of the at least two terminals, the server selects transcoding capability data satisfying a preset decision rule as the second transcoding capability data, the preset decision rule, specifically, may be a condition that enables the particular performance of the terminal to be optimal, or enables quality of communication between the at least two terminals to meet the preset requirement. As an example, the server may select the transcoding capability data with the highest compression efficiency as the second transcoding capability data, which greatly reduces required bandwidth.

In this embodiment, the server sends the second transcoding capability data determined through negotiation to each of the at least two terminals, so that each terminal configures the transcoding parameter based on the second transcoding capability data.

By using the technical solution in the embodiments of the present disclosure, in one aspect, through the one-time data exchange between a transcoding capability configuration device, for example, the server, and the terminal, the server is enabled to select proper transcoding capability data to deliver to the terminal, thereby reducing the number of times of negotiation of a video transcoding capability, and shortening negotiation duration. In another aspect, by preset transcoding capability data stored in the server, subsequent flexible control of a transcoding capability supported by the server is achieved. In still another aspect, by selecting a transcoding capability that satisfies the preset condition, that is, selecting a transcoding capability data with quality of communication between the at least two terminals in the service group being optimal, for example, selecting a transcoding capability data with the highest compression efficiency, bandwidth is greatly saved.

The following describes the transcoding capability configuration method in this embodiment of the present disclosure in detail with reference to a specific negotiation mechanism.

Figure 3:
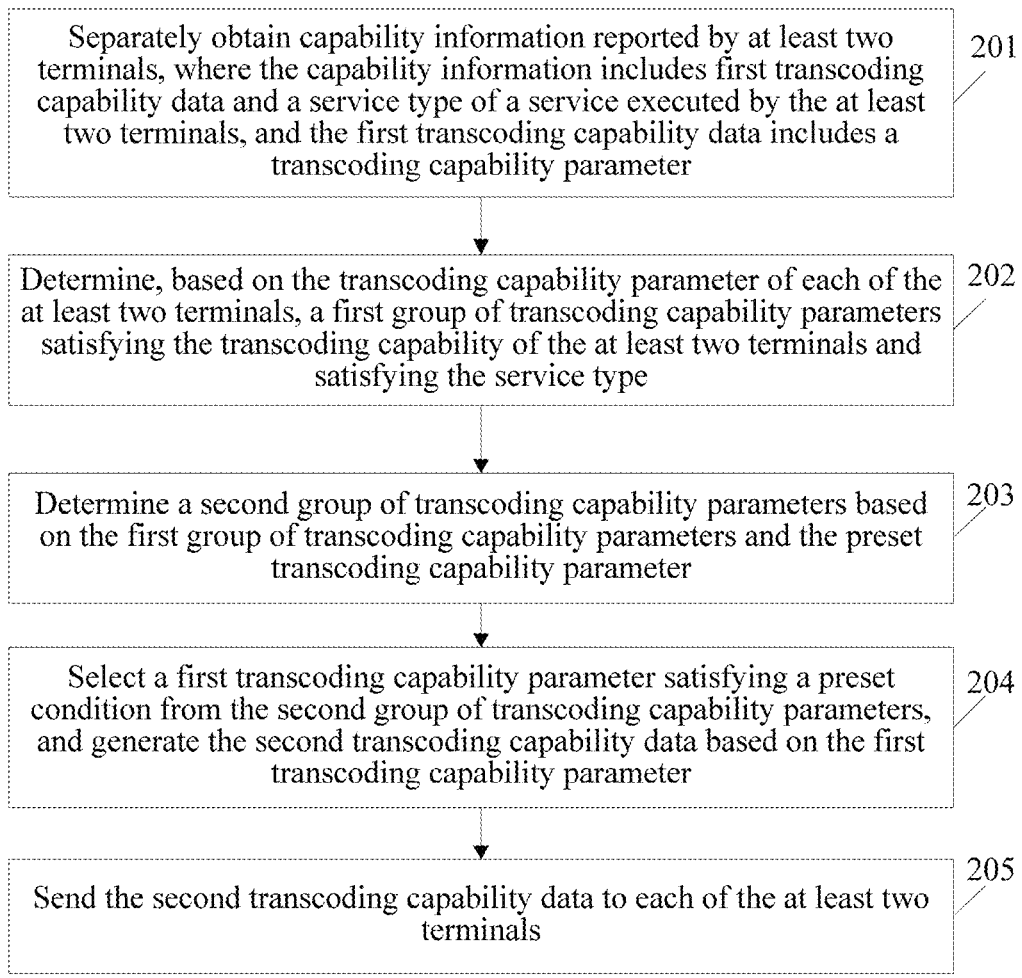
FIG. 3 is a schematic flowchart 2 of a transcoding capability configuration method according to an embodiment of the present disclosure.

An embodiment of the present disclosure further provides a transcoding capability configuration method. FIG. 3 is a schematic flowchart 2 of a transcoding capability configuration method according to an embodiment of the present disclosure. As shown in FIG. 3, the method includes:

Step 201: Separately obtain transcoding capability information reported by at least two terminals, where the capability information includes first transcoding capability data and a service type of a service executed by the at least two terminals, and the at least two terminals belong to a same service group. The first transcoding capability data includes a transcoding capability parameter.

Step 202: Determine, based on the transcoding capability parameter of each of the at least two terminals, a first group of transcoding capability parameters satisfying the transcoding capability of the at least two terminals and satisfying the service type.

Step 203: Determine a second group of transcoding capability parameters based on the first group of transcoding capability parameters and the preset transcoding capability parameter.

Step 204: Select a first transcoding capability parameter satisfying a preset condition from the second group of transcoding capability parameters, and generate the second transcoding capability data based on the first transcoding capability parameter.

Step 205: Send the second transcoding capability data to each of the at least two terminals, so that each terminal configures a transcoding parameter based on the second transcoding capability data.

In this embodiment, the server separately obtains the capability information reported by the at least two terminals belonging to the same service group, and the capability information includes the first transcoding capability data and the service type, where the service type includes the service type that only needs the video encoding, the service type that only needs the video decoding, the service type that needs the video encoding and video decoding, or the like. The foregoing service type is carried in the capability information reported by the terminal, and the service type also represents the service types of the service group to which the at least two terminals belong, that is, the service type performed by the at least two terminals may be the same. As an example, in the application scenario of video monitoring, the service type is the service type of the video encoding; in the application scenario of video on-demand, the service type is the service type of the video decoding; in the application scenario of live streaming, where the live streaming may be understood as multi-user interactive socializing manner using audio and/or video technologies based on a live-streaming platform, the service type may be the service type of multimedia data encoding and decoding, and the multimedia data may include video data and/or audio data; and in the application scenario of the VoIP, the service type may be the service type of multimedia data encoding and decoding, and in particular, for a multi-user video call, simultaneous decoding of multichannel data is further required, and terminals in the same service group have a same service type.

In this embodiment, the server determines, based on the transcoding capability parameter of each of the at least two terminals, a first group of transcoding capability parameters satisfying the transcoding capability of each terminal and satisfying the service type. Specifically, after receiving first transcoding capability data reported by a first terminal of the at least two terminals belonging to the same service group, the server creates a specific space, and then after receiving first transcoding capability data reported by all the terminals in the service group, the server negotiates the transcoding capability data with reference to a service type of the service group, namely, the service type included in the capability information of each terminal. In an actual application, the capability information obtained by the server may include a group identifier, and whether transcoding capability data obtained belong to the same service group can be determined based on the group identifier. The capability information obtained by the server may further include a quantity of terminals in the service group, to determine, based on the quantity of terminals, whether capability information reported by all the terminals in all the service groups has been obtained.

In this embodiment, the first transcoding capability data includes a transcoding capability parameter. For example, each terminal may describe the transcoding capability parameter by a field of 32 bits, namely, may describe the transcoding capability supported by a corresponding terminal by a field of 32 bits. As shown in the following Table 1, if a transcoding capability is supported, a corresponding field is set to 1; correspondingly, if a transcoding capability is not supported, a corresponding field is set to 0.

TABLE 1

| 0 | 1 | 2 | 3 | ... | 31 |
|---|---|---|---|-----|-----|
| H.264 | VP8 | HEVC | VP9 | ... | codecX |

In another implementation, the first transcoding capability data may further include hardware information, software information, and so on. For example, the hardware information may include central processing unit (CPU) information (for example, a CPU clock speed, a quantity of CPU cores), and a hardware codec; and the software information may carry version information of a video data application.

In this embodiment, after obtaining the first transcoding capability data of all the terminals of the at least two terminals, where the first transcoding capability data is specifically the transcoding capability parameter in the first transcoding capability data, the server extracts the encoding and/or decoding capability parameter satisfying the service type in the transcoding capability parameter as ListC. Specifically, if the service type is merely a service type of video encoding, the server selects second transcoding capability data that is related to the type of video encoding and satisfies the encoding capability of each of the at least two terminals; if the service type is merely a service type of video decoding, the server selects second transcoding capability data that is related to the type of video decoding and satisfies the decoding capability of each of the at least two terminals; and if the service type is a service type of video encoding and decoding, the server selects second transcoding capability data that is related to the type of video encoding and decoding and satisfies the encoding and decoding capabilities of each of the at least two terminals. The first group of transcoding capability parameters CodecList1 satisfy:

CodecList1=ListC(1) & ListC(2) & ... ListC(n);

where n represents a quantity of the terminals belonging to the same service group; and "&" represents logic and operations.

In this embodiment, the server is preconfigured with a preset transcoding capability data corresponding to a terminal type, and the preset transcoding capability data is the transcoding capability parameter preferably supported by the terminals of common models. Some transcoding capabilities are supported by the terminal, but are inefficient or error-prone. That the transcoding capability is supported is indicated in the transcoding capability data reported by the terminal, but that the transcoding capability is not supported is indicated the preset transcoding capability data, where the preset transcoding capability data is specifically the preset transcoding capability parameter. The preset transcoding capability parameter corresponding to a terminal can be recorded as ListS. The second group of transcoding capability parameters CodecList2 satisfy:

CodecList2=(ListC(1) & ListS(1)) &(ListC(2) & ListS(2)) & ... (ListC(n) & ListS(n)).

In this embodiment, the second group of transcoding capability parameters may include more than one transcoding capability parameter, namely, there may be more than one transcoding capability parameter that satisfies the service type, the transcoding capability supported by each of the at least two terminals, and the preset transcoding capability parameter that is stored in the server and is associated with the corresponding terminal type. The server selects transcoding capability data satisfying a preset condition as the second transcoding capability data. Specifically, the preset condition may be a condition where the particular performance of the terminal is optimized. For example, the server may select transcoding capability data having the highest compression efficiency as the second transcoding capability data. For example, if the second group of transcoding capability parameters include two types of transcoding capability parameters of H.264 and HEVC (High Efficiency Video Coding), HEVC may be selected as the second transcoding capability data.

In this embodiment, the server sends the second transcoding capability data determined by negotiation to each of the at least two terminals, to make each terminal configure the transcoding parameter based on the second transcoding capability data.

In the technical solution in the embodiments of the present disclosure, according to a first aspect, one-time data exchange between a transcoding capability configuration device (for example, a server) and the terminal makes the server select appropriate transcoding capability data to be sent to the terminal, thereby reducing a quantity of negotiation times of a video transcoding capability and shortening a negotiation time. According to a second aspect, the preset transcoding capability data stored in the server facilitates subsequent flexible control of the transcoding capability supported by the server. According to a third aspect, selecting the transcoding capability data satisfying the preset condition, namely, selecting the transcoding capability data optimizing the quality of communication between the at least two terminals in the service group, for example, selecting the transcoding capability data having the highest compression efficiency, can greatly save the bandwidth.

Figure 4:
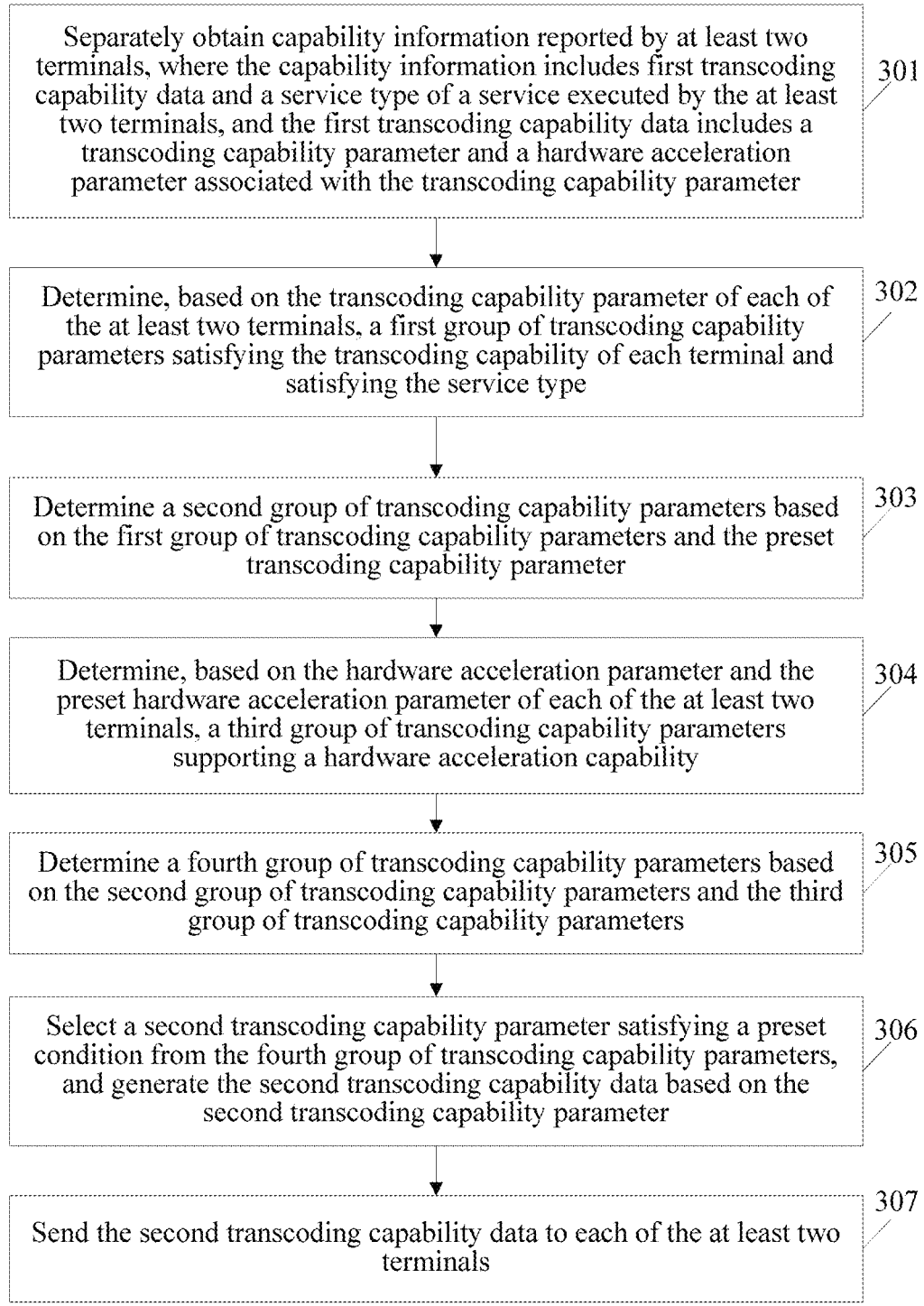
FIG. 4 is a schematic flowchart 3 of a transcoding capability configuration method according to an embodiment of the present disclosure.

An embodiment of the present disclosure further provides a transcoding capability configuration method. FIG. 4 is a schematic flowchart 3 of a transcoding capability configuration method according to an embodiment of the present disclosure. As shown in FIG. 4, the method includes:

Step 301: Separately obtain transcoding capability information reported by at least two terminals, where the capability information includes first transcoding capability data and a service type of a service executed by the at least two terminals, and the at least two terminals belong to a same service group. The first transcoding capability data includes a transcoding capability parameter and a hardware acceleration parameter associated with the transcoding capability parameter.

Step 302: Determine, based on the transcoding capability parameter of each of the at least two terminals, a first group of transcoding capability parameters satisfying the transcoding capability of each terminal and satisfying the service type.

Step 303: Determine a second group of transcoding capability parameters based on the first group of transcoding capability parameters and the preset transcoding capability parameter.

Step 304: Determine, based on the hardware acceleration parameter and the preset hardware acceleration parameter of each of the at least two terminals, a third group of transcoding capability parameters supporting a hardware acceleration capability.

Step 305: Determine a fourth group of transcoding capability parameters based on the second group of transcoding capability parameters and the third group of transcoding capability parameters.

Step 306: Select a second transcoding capability parameter satisfying a preset condition from the fourth group of transcoding capability parameters, and generate the second transcoding capability data based on the second transcoding capability parameter.

Step 307: Send the second transcoding capability data to each of the at least two terminals, so that each terminal configures a transcoding parameter based on the second transcoding capability data.

In this embodiment, the server obtains capability information reported by at least two terminals belonging to the same service group respectively; the capability information includes a first transcoding capability data and service types. The service types include a service type merely needing video encoding, or a service type merely needing video decoding, or a service type needing video encoding and decoding and so on. The foregoing service types are carried in the capability information reported by the terminal, and the service types further represent service types of the service group to which the at least two terminals belong, namely, the at least two terminals may perform the same service type. For example, in an application scenario of video surveillance, the service type is video encoding; in an application scenario of video on demand, the service type is video decoding; in an application scenario of live streaming, where the live streaming may be understood as multi-user interactive socializing mode using an audio and/or video technology based on a live broadcast platform, the service type may be multimedia data encoding and decoding, and the multimedia data may include video data and/or audio data; in an application scenario of VOID, the service type may be multimedia data encoding and decoding, and specifically, multichannel data needs to be decoded at the same time for multiplayer video calls. The terminals in the same service group have the same service type.

In this embodiment, the server determines, based on the transcoding capability parameter of each of the at least two terminals, a first group of transcoding capability parameters satisfying the transcoding capability of each terminal and satisfying the service type. Specifically, after receiving first transcoding capability data reported by a first terminal of the at least two terminals belonging to the same service group, the server creates a specific space, and then after receiving first transcoding capability data reported by all the terminals in the service group, the server negotiates the transcoding capability data with reference to a service type of the service group, namely, the service type included in the capability information of each terminal. In actual applications, the capability information obtained by the server may include a group identifier, and whether transcoding capability data obtained belong to that of the same service group can be determined based on the group identifier. The capability information obtained by the server may further include a quantity of terminals in the service group, to determine, based on the quantity of terminals, whether capability information reported by all the terminals in the service group have been obtained.

In this embodiment, the first transcoding capability data includes a transcoding capability parameter. For example, each terminal may describe the transcoding capability parameter by a field of 32 bits, namely, may describe the transcoding capability supported by a corresponding terminal by a field of 32 bits. As shown in the following Table 1, if a transcoding capability is supported, a corresponding field is set to 1; correspondingly, if a transcoding capability is not supported, a corresponding field is set to 0.

In another implementation, the first transcoding capability data may further include hardware information, software information, and so on. For example, the hardware information may include CPU information (for example, a CPU clock speed and a quantity of CPU cores), and a hardware codec; and the software information may carry version information of a video data application.

In this embodiment, after obtaining the first transcoding capability data of all the terminals of the at least two terminals, where the first transcoding capability data is specifically the transcoding capability parameter in the first transcoding capability data, the server extracts the encoding and/or decoding capability parameter satisfying the service type in the transcoding capability parameter as ListC. Specifically, if the service type is merely a service type of video encoding, the server selects second transcoding capability data that is related to the type of video encoding and satisfies the encoding capability of each of the at least two terminals; if the service type is merely a service type of video decoding, the server selects second transcoding capability data that is related to the type of video decoding and satisfies the decoding capability of each of the at least two terminals; and if the service type is a service type of video encoding and decoding, the server selects second transcoding capability data that is related to the type of video encoding and decoding and satisfies the encoding and decoding capability of each of the at least two terminals. The first group of transcoding capability parameters CodecList1 satisfy:

CodecList1=ListC(1)& ListC(2)& ... ListC(n);

where n represents a quantity of the terminals belonging to the same service group; and "&" represents logic and operations.

In this embodiment, the server is preconfigured with a preset transcoding capability data corresponding to a terminal type, and the preset transcoding capability data is the transcoding capability parameter preferably supported by the terminals of common models. Some transcoding capabilities are supported by the terminal, but are inefficient or error-prone. That the transcoding capability is supported is indicated in the transcoding capability data reported by the terminal, but that the transcoding capability is not supported is indicated in the preset transcoding capability data, where the preset transcoding capability data is specifically the preset transcoding capability parameter. The preset transcoding capability parameter corresponding to a terminal can be recorded as ListS. The second group of transcoding capability parameters CodecList2 satisfy:

CodecList2=(ListC(1)& ListS(1))&(ListC(2)& ListS(2))& ... (ListC(n)& ListS(n)).

In this embodiment, the first transcoding capability data further includes a hardware acceleration parameter associated with the transcoding capability parameter, which can be understood as that the hardware acceleration parameter represents whether the corresponding transcoding capability parameter supports a hardware acceleration capability. For details, referring to Table 1 in the foregoing embodiment, the transcoding capability parameter represented by each field bit in the 32-bit field corresponds to an identifier of the hardware acceleration parameter, for example, if the transcoding capability parameter has a hardware acceleration capability, the corresponding field is set to 1; correspondingly, if the transcoding capability parameter does not have a hardware acceleration capability, the corresponding field is set to 0. On the other hand, the server stores a preset hardware acceleration parameter, and the preset hardware acceleration parameter represents whether the common transcoding capability supports hardware acceleration. In this embodiment, the third transcoding capability parameter CodecList3 satisfies:

CodecList3=HWC(i)& HWS(i).

HWC (i) represents a hardware acceleration parameter reported by a terminal i and associated with the transcoding capability parameters; HWS(i) represents the hardware acceleration parameter that is preset in the server and that matches the type of the terminal and is associated with the transcoding capability parameter; a field bit that is in a same order as that of the transcoding capability parameter in Table 1 can be defined in HWC (i) and HWS (i), "1" or "0" in each field bit indicates whether the corresponding transcoding capability parameter supports a hardware acceleration capability; if the corresponding terminal does not support a hardware acceleration capability, each field bit can be set to "0". In practical application, the transcoding capability parameter can be expressed by, for example, the transcoding capability list in Table 1; the hardware acceleration parameter can be represented by a hardware acceleration list in a same sequence of the transcoding parameter as defined in Table 1.

Further, the fourth group of transcoding capability parameters are determined based on the second group of transcoding capability parameters and the third group of transcoding capability parameters; and the fourth group of transcoding capability parameters CodecList4 satisfy:

CodecList4=CodecList3& CodecList2;
CodecList3=HWC(i)& HWS(i); and
CodecList2=(ListC(1)& ListS(1))&(ListC(2)& ListS(2))& ... (ListC(n)& ListS(n)).

In this embodiment, there may be more than one transcoding capability parameter contained in the fourth group of transcoding capability parameters, then the server selects the transcoding capability data that satisfies the preset condition from the fourth group of transcoding capability parameters as the second transcoding capability data. The preset condition can be specifically a condition that makes the particular performance of the terminal optimal. As an example, the server can choose the transcoding capability data with the highest compression efficiency as the second transcoding capability data. For example, if the fourth group of transcoding capability parameters include two types of transcoding capability parameters of H.264 and HEVC, the HEVC can be selected as the second transcoding capability data.

In this embodiment, the server sends the second transcoding capability data determined through negotiation to each terminal in the at least two terminals, so that each terminal configures a transcoding parameter based on the second transcoding capability data.

In the technical solution of the embodiments of the present disclosure, in a first aspect, one-time data exchange between the transcoding capability configuration device (such as a server) and a terminal makes the server select the appropriate transcoding capability data to be delivered to the terminal, thereby reducing a number of times of negotiation of a video transcoding capability, and shortening a negotiation time. In a second aspect, through the preset transcoding capability data stored in the server, the server supports subsequent flexible control of the transcoding capability. In a third aspect, the video transcoding processing is performed by using the hardware acceleration capability, to greatly improve the video transcoding performance, and reduce CPU power consumption of the terminal. In a fourth respect, by selecting the transcoding capability data satisfying the preset condition, that is, selecting transcoding capability data that makes the quality of communication between the at least two terminals in the service group optimal, for example, selecting the transcoding capability data with highest compression efficiency, the bandwidth is greatly saved.

Figure 5:
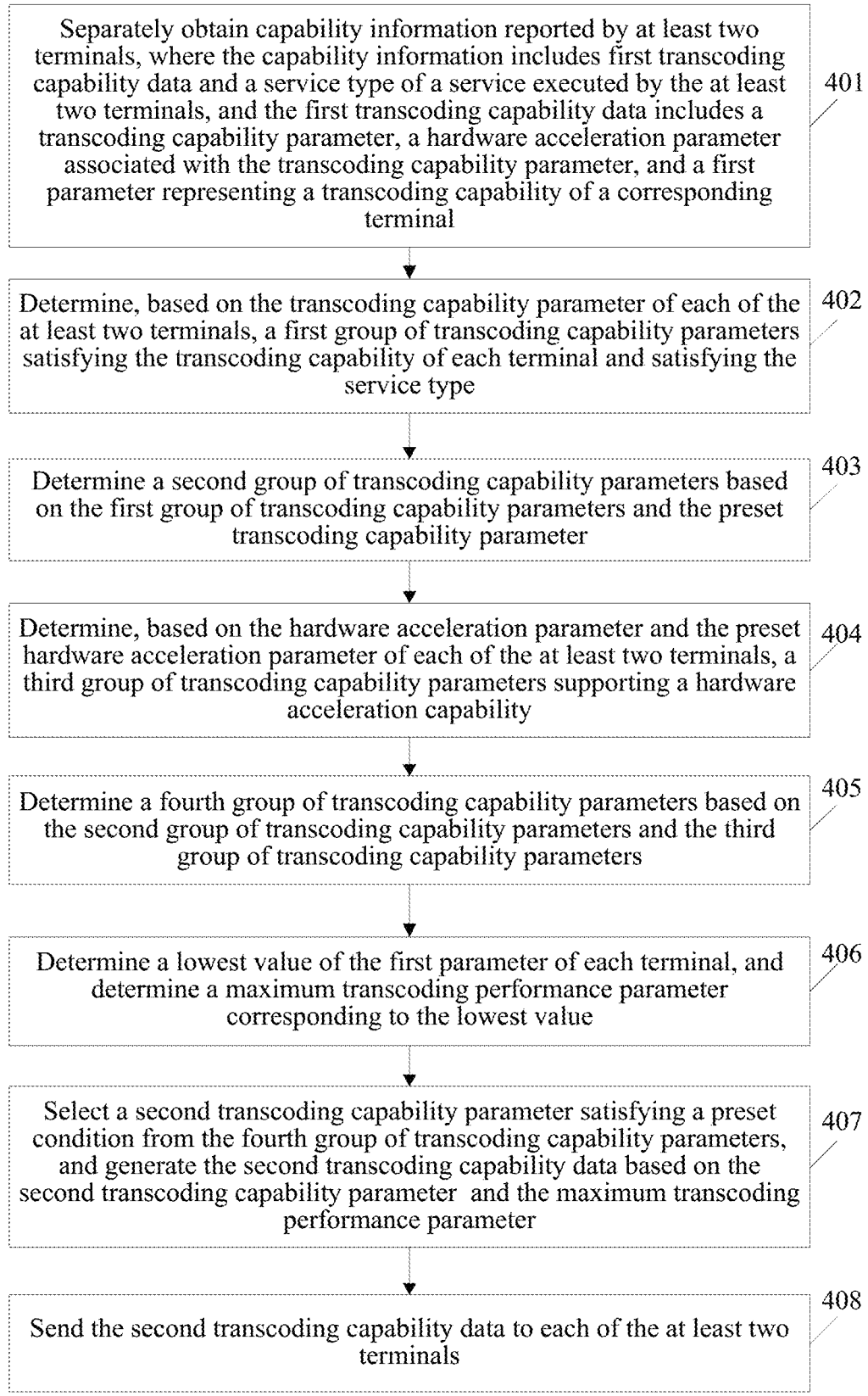
FIG. 5 is a schematic flowchart 4 of a transcoding capability configuration method according to an embodiment of the present disclosure.

An embodiment of the present disclosure further provides a transcoding capability configuration method. FIG. 5 is a schematic flowchart 4 of a transcoding capability configuration method according to an embodiment of the present disclosure. As shown in FIG. 5, the method includes:

Step 401: Separately obtain transcoding capability information reported by at least two terminals, where the capability information includes first transcoding capability data and a service type of a service executed by the at least two terminals, and the at least two terminals belong to a same service group. The first transcoding capability data includes a transcoding capability parameter, a hardware acceleration parameter associated with the transcoding capability parameter, and a first parameter representing a transcoding capability of a corresponding terminal.

Step 402: Determine, based on the transcoding capability parameter of each of the at least two terminals, a first group of transcoding capability parameters satisfying the transcoding capability of each terminal and satisfying the service type.

Step 403: Determine a second group of transcoding capability parameters based on the first group of transcoding capability parameters and the preset transcoding capability parameter.

Step 404: Determine, based on the hardware acceleration parameter and the preset hardware acceleration parameter of each of the at least two terminals, a third group of transcoding capability parameters supporting a hardware acceleration capability.

Step 405: Determine a fourth group of transcoding capability parameters based on the second group of transcoding capability parameters and the third group of transcoding capability parameters.

Step 406: Determine a lowest value of the first parameter of each terminal, and determining a maximum transcoding performance parameter corresponding to the lowest value.

Step 407: Select a second transcoding capability parameter satisfying a preset condition from the fourth group of transcoding capability parameters, and generate the second transcoding capability data based on the second transcoding capability parameter and the maximum transcoding performance parameter.

Step 408: Send the second transcoding capability data to each of the at least two terminals, so that each terminal configures a transcoding parameter based on the second transcoding capability data.

Distinguished from the previous embodiment, in this embodiment, the first transcoding capability data further includes: a first parameter representing the transcoding capability of a corresponding terminal. The first parameter may be a score value obtained by scoring a transcoding capability of the terminal based on a hardware parameter and a software type of the terminal, and the first parameter can distinguish the difference of transcoding performance between terminals. Specifically, the terminal can be scored by using at least one of the following parameters: a CPU clock speed, a quantity of CPU cores, an acceleration instruction set, hardware acceleration capabilities, etc. As an example, the value of the first parameter can be between (0,100], a larger value can indicate a stronger transcoding capability, and a smaller value can indicate a weaker transcoding capability. In this embodiment, the server configures the transcoding performance parameters of each terminal in the at least two terminals based on the first parameter reported by the terminal; the transcoding performance parameters may include at least one of the following parameters: the highest bit rate, the highest frame rate, the highest I frame interval, the maximum redundancy rate, the maximum resolution, the maximum frames per second (FPS, Frames Per Second), and the like.

In an implementation, in consideration of the experience of a user corresponding to each terminal in the at least two terminals, the server determine, based on a first parameter of each of the at least two terminals obtained, the lowest value (that is, the minimum value) of the first parameter corresponding to each terminal. The maximum transcoding performance parameter corresponding to the lowest value can be found through a preconfigured mapping table, for example, as shown in Table 2. Table 2 shows the correspondence between the encoding level of the terminal that supports H.264 and the maximum performance parameter set, where the encoding level represents the range of values for the first parameter. The maximum transcoding performance parameters in the mapping table that corresponds to each first parameter interval can be determined according to a quality of service (QoS, Quality of Service) control algorithm and a real-time network state.

TABLE 2

| Encoding level | Maximum performance parameter set |
| --- | --- |
| (90, 100] | MaxReolution = 1280 × 720<br>MaxFps = 30 . . . |
| (70, 90] | MaxReolution = 640 × 480<br>MaxFps = 24 . . . |
| (50, 70] | MaxReolution = 480 × 360<br>MaxFps = 20 . . . |
| (0, 50] | MaxReolution = 320 × 240<br>MaxFps = 15 . . . |

Further, there may be more than one transcoding capability parameter contained in the fourth group of transcoding capability parameters, then the server selects the transcoding capability data in the fourth group of transcoding capability parameters that satisfies the preset condition. The transcoding capability data that satisfies the preset condition and the maximum transcoding performance parameter are used as the second transcoding capability data. The preset condition can be specifically the condition that makes the particular performance of the terminal optimal. As an example, the server can choose the transcoding capability data with the highest compression efficiency as the transcoding capability parameter finally determined through negotiation. For example, if the fourth group of transcoding capability parameters include two transcoding capability parameters of H.264 and HEVC, the HEVC can be selected as the transcoding capability parameters finally determined through negotiation.

In this embodiment, the server sends the second transcoding capability data determined through negotiation to each terminal in the at least two terminals, so that each terminal configures the transcoding parameter based on the second transcoding capability data.

In the technical solution of the embodiment of the present disclosure, in a first aspect, one-time data exchange between the transcoding capability configuration device (such as a server) and a terminal makes the server select the appropriate transcoding capability data to be delivered to the terminal, thereby reducing a number of times of negotiation of a video transcoding capability, and shortening a negotiation time. In a second aspect, through the preset transcoding capability data stored in the server, the server supports subsequent flexible control of the transcoding capability. In a third aspect, the video transcoding processing is performed by using the hardware acceleration capability, to greatly improve the video transcoding performance, and reduce CPU power consumption of the terminal. In a fourth respect, by selecting the transcoding capability data satisfying the preset condition, that is, selecting transcoding capability data that makes the quality of communication between the at least two terminals in the service group optimal, for example, selecting the transcoding capability data with highest compression efficiency, the bandwidth is greatly saved.

Figure 6:
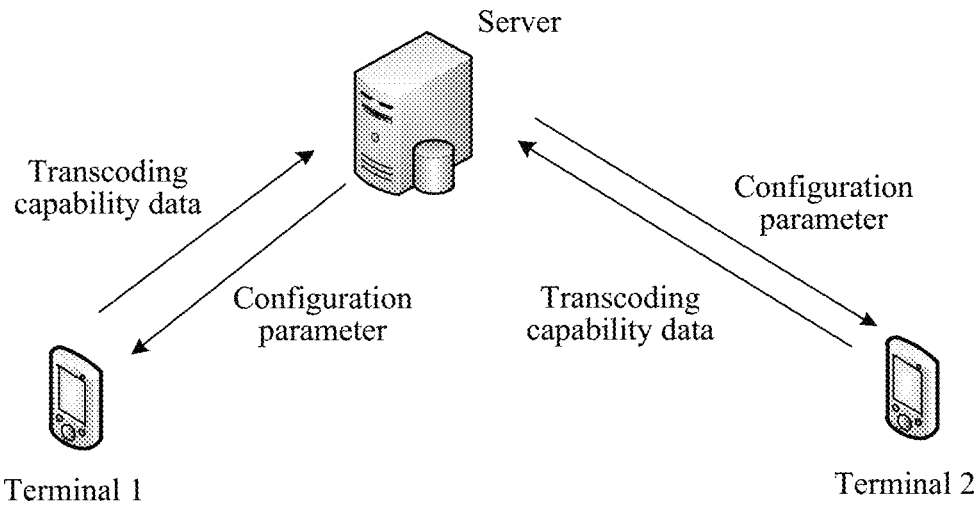
FIG. 6 is a schematic interaction flowchart of a transcoding capability configuration method according to an embodiment of the present disclosure.

The transcoding capability configuration solution of the embodiment of the present disclosure can be applied to a variety of application scenarios, including but not limited to video surveillance, video-on-demand, live streaming, VoIP and many other applications. FIG. 6 is a schematic flowchart of interaction of a transcoding capability configuration method according to an embodiment of the present disclosure. In this illustration, assuming that a current scenario of a VoIP call is used, as shown in FIG. 6, before a terminal 1 and a terminal 2 set up a call, which can also be understood as that the terminal 1 and the terminal 2 transmit multimedia data (such as video data), the terminal 1 and the terminal 2 respectively send their respective transcoding capability data to the server. The transcoding capability data here can be used as the first transcoding capability data; the transcoding capability data may include the transcoding capability parameters supported by the terminal (which specifically may be indicated by the foregoing field of 32 bits), hardware information, software information, a service type, a hardware acceleration parameter associated with the transcoding capability parameters, and the first parameter representing the transcoding capability (that is, the score value of the transcoding capability) and so on. The server makes comprehensive evaluation decisions based on the received transcoding capability data of the terminal 1 and the terminal 2 of a same group, and finally selects the configuration parameters containing the second transcoding capability data to be delivered to the terminal 1 and the terminal 2, so that the terminal 1 and the terminal 2 are set based on the delivered configuration parameters. In this case, in the transcoding capability configuration solution in the embodiment of the present disclosure, the server and the terminal interact once, to enable the server to select the appropriate transcoding capability data to be delivered to the terminal, reduce the number of negotiation times of the video transcoding capability, and shorten the negotiation time.

Figure 7:
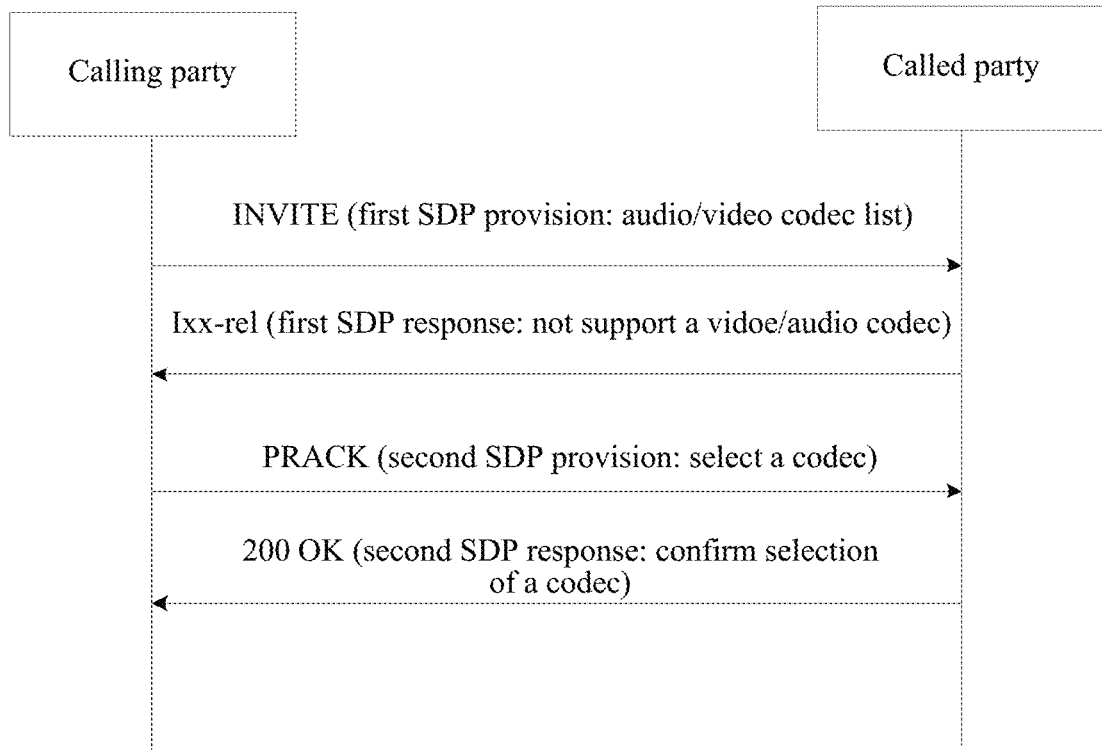
FIG. 7 is a schematic interaction diagram of negotiating a video transcoding capability in the existing technology.

Compared to the transcoding capability configuration solution shown in FIG. 6, for the negotiation mechanism in the existing technology, refer to FIG. 7. In the existing technology, the negotiation of video transcoding capability between terminals mainly adopts a Session Description Protocol (SDP, Session Description Protocol) request/response session mechanism based on the Session Initiation Protocol (SIP, Session Initiation Protocol). Both sides of the session (there can also be multiple parties) respond back and forth to determine a supported transcoding parameter through negotiation. The session form can be as follows:

m=video 49170 RTP/AVP 98;

a=rtpmap:98 H264/90000;

a=fmtp:98 profile-level-id=42A01E; packetization-mode=1;

sprop-parameter-sets=ZOIACpZTBYmI,aMljiA.

m=video indicates that the video is configured, 49170 represents the port number, RTP represents the protocol, 98 represents a codec number, a profile-level-id parameter is used to indicate the profile type and level of the H.264 stream, and a sprop-parameter-sets parameter is used to indicate the sequence parameter sets (Sequence Parameter sets, SPS)/picture parameter set (Picture Parameter Set, PPS). The second to the fourth expressions mentioned above specifically explain the related configuration of the video codec (codec). For example, it can be seen that the video codec uses the H.264 coding scheme, and level information and the SPS/PPS parameter set and the like of the video codec.

Refer to the session negotiation mechanism for SIP-based SDP request/response mode shown in FIG. 7. INVITE indicates that the calling user initiates a session request and invites the called party to join a session. "1xx-rel" represents the response message of the called party, and carries a list of codec that the called party does not support, to establish the session. PRACK represents a confirmation request message for a 1XX-REL response message, where the calling party selects a codec, and "200 OK" message represents a successful response, i.e., the called party confirms the choice of the above codec. This requires negotiation back and forth at least twice, takes a long time, and is greatly affected by a network status.

Figure 8:
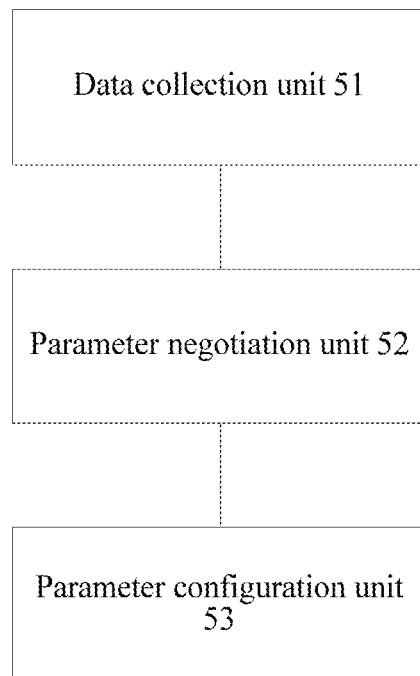
FIG. 8 is a schematic structural composition diagram 1 of a transcoding capability configuration device according to an embodiment of the present disclosure.

An embodiment of the present disclosure further provides a transcoding capability configuration device. FIG. 8 is a schematic structural composition diagram 1 of a transcoding capability configuration device according to an embodiment of the present disclosure. As shown in FIG. 8, the device includes: a data collection unit 51, a parameter negotiation unit 52, and a parameter configuration unit 53; where the data collection unit 51 is configured to separately obtain transcoding capability information reported by at least two terminals, where the capability information includes first transcoding capability data and a service type of a service executed by the at least two terminals, and the at least two terminals belong to a same service group;

the parameter negotiation unit 52 is configured to determine, based on the first transcoding capability data and the service type of each of the at least two terminals, second transcoding capability data satisfying the at least two terminals; and the parameter configuration unit 53 is configured to send the second transcoding capability data to each of the at least two terminals, so that each terminal configures a transcoding parameter based on the second transcoding capability data.

Figure 9:
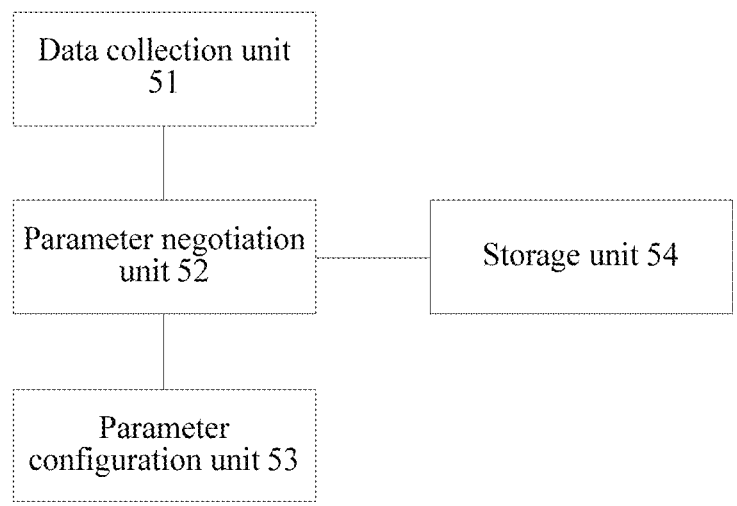
FIG. 9 is a schematic structural composition diagram 2 of a transcoding capability configuration device according to an embodiment of the present disclosure.

In an implementation, FIG. 9 is a schematic structural composition diagram 2 of a transcoding capability configuration device according to an embodiment of the present disclosure. As shown in FIG. 9, the device further includes a storage unit 54, configured to store preset transcoding capability data; and the parameter negotiation unit 52 is configured to determine, based on the first transcoding capability data and preset transcoding capability data of each of the at least two terminals, the second transcoding capability data satisfying each terminal and satisfying the service type.

In an implementation, the parameter negotiation unit 52 is configured to: when at least two pieces of transcoding capability data satisfy each terminal and satisfy the service type, determine to select the second transcoding capability data from the at least two pieces of transcoding capability data based on a preset decision rule, where the second transcoding capability data enables quality of communication between the at least two terminals to satisfy a preset requirement.

A person skilled in the art should understand that for understanding of the functions of the processing units of the transcoding capability configuration device according to this embodiment of the present disclosure, refer to related descriptions of the foregoing transcoding capability configuration method. The processing units of the transcoding capability configuration device in this embodiment of the present disclosure may be implemented by an analog circuit performing the functions of the embodiments of the present disclosure, or may be implemented by software that performs the functions of the embodiments of the present disclosure running on a smart terminal.

An embodiment of the present disclosure further provides a transcoding capability configuration device. For specifics, refer to FIG. 9. The device includes: a data collection unit 51, a parameter negotiation unit 52, a parameter configuration unit 53, and a storage unit 54; where the data collection unit 51 is configured to separately obtain transcoding capability information reported by at least two terminals, where the capability information includes first transcoding capability data and a service type of a service executed by the at least two terminals, the at least two terminals belong to a same service group, and the first transcoding capability data includes a transcoding capability parameter;

the parameter negotiation unit 52 is configured to: determine, based on the transcoding capability parameter of each of the at least two terminals, a first group of transcoding capability parameters satisfying the transcoding capabilities of the at least two terminals and satisfying the service type;

the storage unit 54 is configured to store preset transcoding capability data; where the preset transcoding capability data includes a preset transcoding capability parameter;

the parameter negotiation unit 52 is further configured to: determine a second group of transcoding capability parameters based on the first group of transcoding capability parameter sand the preset transcoding capability parameter; and select a first transcoding capability parameter satisfying a preset condition from the second group of transcoding capability parameters, and generate the second transcoding capability data based on the first transcoding capability parameter; and the parameter configuration unit 53 is configured to send the second transcoding capability data to each of the at least two terminals, so that each terminal configures a transcoding parameter based on the second transcoding capability data.

A person skilled in the art should understand that for understanding of the functions of the processing units of the transcoding capability configuration device according to this embodiment of the present disclosure, refer to related descriptions of the foregoing transcoding capability configuration method. The processing units of the transcoding capability configuration device in this embodiment of the present disclosure may be implemented by an analog circuit performing the functions of the embodiments of the present disclosure, or may be implemented by software that performs the functions of the embodiments of the present disclosure running on a smart terminal.

An embodiment of the present disclosure further provides a transcoding capability configuration device. For specifics, refer to FIG. 9. The device includes: a data collection unit 51, a parameter negotiation unit 52, a parameter configuration unit 53, and a storage unit 54; where the data collection unit 51 is configured to separately obtain transcoding capability information reported by at least two terminals, where the capability information includes first transcoding capability data and a service type of a service executed by the at least two terminals, the at least two terminals belong to a same service group, and the first transcoding capability data includes a transcoding capability parameter and a hardware acceleration parameter associated with the transcoding capability parameter;

the parameter negotiation unit 52 is configured to: determine, based on the transcoding capability parameter of each of the at least two terminals, a first group of transcoding capability parameters satisfying the transcoding capabilities of the at least two terminals and satisfying the service type;

the storage unit 54 is configured to store preset transcoding capability data; where the preset transcoding capability data includes a preset transcoding capability parameter and a preset hardware acceleration parameter associated with the preset transcoding capability parameter;

the parameter negotiation unit 52 is further configured to: determine a second group of transcoding capability parameters based on the first group of transcoding capability parameters and the preset transcoding capability parameter; determine, based on the hardware acceleration parameter and the preset hardware acceleration parameter of each of the at least two terminals, a third group of transcoding capability parameters supporting a hardware acceleration capability; determine a fourth group of transcoding capability parameters based on the second group of transcoding capability parameters and the third group of transcoding capability parameters; and select a second transcoding capability parameter satisfying a preset condition from the fourth group of transcoding capability parameters, and generate the second transcoding capability data based on the second transcoding capability parameter; and the parameter configuration unit 53 is configured to send the second transcoding capability data to each of the at least two terminals, so that each terminal configures a transcoding parameter based on the second transcoding capability data.

A person skilled in the art should understand that for understanding of the functions of the processing units of the transcoding capability configuration device according to this embodiment of the present disclosure, refer to related descriptions of the foregoing transcoding capability configuration method. The processing units of the transcoding capability configuration device in this embodiment of the present disclosure may be implemented by an analog circuit performing the functions of the embodiments of the present disclosure, or may be implemented by software that performs the functions of the embodiments of the present disclosure running on a smart terminal.

An embodiment of the present disclosure further provides a transcoding capability configuration device. For specifics, refer to FIG. 9. The device includes: a data collection unit 51, a parameter negotiation unit 52, a parameter configuration unit 53, and a storage unit 54; where the data collection unit 51 is configured to separately obtain transcoding capability information reported by at least two terminals, where the capability information includes first transcoding capability data and a service type of a service executed by the at least two terminals, the at least two terminals belong to a same service group, and the first transcoding capability data includes a transcoding capability parameter, a hardware acceleration parameter associated with the transcoding capability parameter, and a first parameter representing a transcoding capability of a corresponding terminal;

the parameter negotiation unit 52 is configured to: determine, based on the transcoding capability parameter of each of the at least two terminals, a first group of transcoding capability parameters satisfying the transcoding capabilities of the at least two terminals and satisfying the service type;

the storage unit 54 is configured to store preset transcoding capability data; where the preset transcoding capability data includes a preset transcoding capability parameter and a preset hardware acceleration parameter associated with the preset transcoding capability parameter;

the parameter negotiation unit 52 is further configured to: determine a second group of transcoding capability parameters based on the first group of transcoding capability parameters and the preset transcoding capability parameter; determine, based on the hardware acceleration parameter and the preset hardware acceleration parameter of each of the at least two terminals, a third group of transcoding capability parameters supporting a hardware acceleration capability; and determine a fourth group of transcoding capability parameters based on the second group of transcoding capability parameters and the third group of transcoding capability parameters; and is further configured to: determine a lowest value of the first parameter of each terminal, and determining a maximum transcoding performance parameter corresponding to the lowest value; and select a second transcoding capability parameter satisfying a preset condition from the fourth group of transcoding capability parameters, and generate the second transcoding capability data based on the second transcoding capability parameter and the maximum transcoding performance parameter; and the parameter configuration unit 53 is configured to send the second transcoding capability data to each of the at least two terminals, so that each terminal configures a transcoding parameter based on the second transcoding capability data.

In the embodiment of the present disclosure, the parameter negotiation unit 52 in the device can be implemented by a CPU, a digital signal processor (DSP, Digital Signal Processor), a microcontroller unit (MCU, Microcontroller unit) or a field-programmable gate array (FPGA, Field-Programmable Gate array) in the device in a practical application. The data collection unit 51 and the parameter configuration unit 53 in the device can be implemented by a communications module (including: a basic communications suite, an operating system, a communications module, a standardized interface and a protocol, etc.) and a transceiver antenna in a practical application. The storage unit 54 in the device can be implemented by a memory in a practical application.

Figure 10:
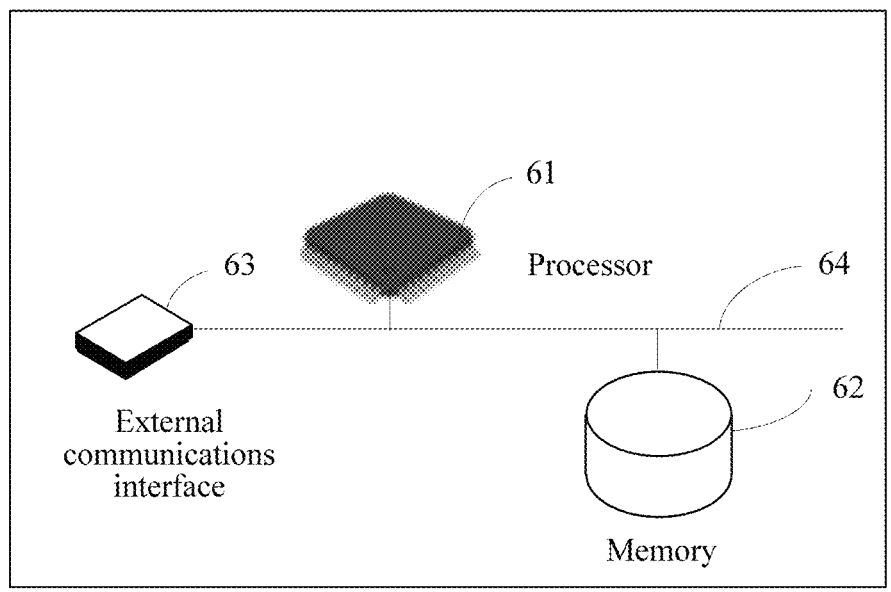
FIG. 10 is a schematic structural composition diagram of hardware of a transcoding capability configuration device according to an embodiment of the present disclosure.

The embodiment of the present disclosure further provides a transcoding capability configuration device, as shown in FIG. 10, including a memory 62, a processor 61 and a at least one external communications interface 63; the memory 62 stores a computer program that can run on the processor 61, and the processor 61, the storage media 62, and the external communications interface 63 are all connected by a bus 64. When executing the program, the processor 61 performs the following steps: separately obtaining capability information reported by at least two terminals, where the capability information includes first transcoding capability data and a service type of a service executed by the at least two terminals, and the at least two terminals belong to a same service group; determining, based on the first transcoding capability data and the service type of each of the at least two terminals, second transcoding capability data satisfying the at least two terminals; and sending the second transcoding capability data to each of the at least two terminals, so that each terminal configures a transcoding parameter based on the second transcoding capability data.

In an implementation, when executing the program, the processor 61 performs the following steps: determining, based on the first transcoding capability data and preset transcoding capability data of each of the at least two terminals, the second transcoding capability data satisfying each terminal and satisfying the service type.

In an implementation, when executing the program, the processor 61 performs the following steps: when at least two pieces of transcoding capability data satisfy each terminal and satisfy the service type, determining to select the second transcoding capability data from the at least two pieces of transcoding capability data based on a preset decision rule, where the second transcoding capability data enables quality of communication between the at least two terminals to satisfy a preset requirement.

In an implementation, the first transcoding capability data includes a transcoding capability parameter; and the preset transcoding capability data includes a preset transcoding capability parameter. When executing the program, the processor 61 performs the following steps: determining, based on the transcoding capability parameter of each of the at least two terminals, a first group of transcoding capability parameters satisfying the transcoding capability of each terminal and satisfying the service type; determining a second group of transcoding capability parameters based on the first group of transcoding capability parameters and the preset transcoding capability parameter; and selecting a first transcoding capability parameter satisfying a preset condition from the second group of transcoding capability parameters, and generating the second transcoding capability data based on the first transcoding capability parameter.

In an implementation, the first transcoding capability data further includes a hardware acceleration parameter associated with the transcoding capability parameter; and the preset transcoding capability data further includes a preset hardware acceleration parameter associated with the preset transcoding capability parameter. When executing the program, the processor 61 performs the following steps: after determining a second group of transcoding capability parameters based on the first group of transcoding capability parameters and the preset transcoding capability parameter; determining, based on the hardware acceleration parameter and the preset hardware acceleration parameter of each of the at least two terminals, a third group of transcoding capability parameters supporting a hardware acceleration capability; determining a fourth group of transcoding capability parameters based on the second group of transcoding capability parameters and the third group of transcoding capability parameters; and selecting a second transcoding capability parameter satisfying a preset condition from the fourth group of transcoding capability parameters, and generating the second transcoding capability data based on the second transcoding capability parameter.

In an implementation, the first transcoding capability data further includes: a first parameter representing a transcoding capability of a corresponding terminal. When executing the program, the processor 61 performs the following steps: before generating the second transcoding capability data based on the second transcoding capability parameter, determining a lowest value of the first parameter of each terminal, and determining a maximum transcoding performance parameter corresponding to the lowest value; and generating the second transcoding capability data based on the second transcoding capability parameter and the maximum transcoding performance parameter.

It may be understood that, the memory 62 can be a volatile memory or a non-volatile memory, and can also include both volatile and non-volatile memories. The non-volatile memory can be a read only memory (ROM, Read only Memory), a programmable read-only memory (PROM, Programmable Read-Only Memory), an erasable programmable read-only memory (EPROM, Erasable Programmable Read-Only Memory), an electrically erasable programmable read-only memory (EEPROM, Electrically Erasable programmable read-only Memory), a ferromagnetic random access memory (FRAM, ferromagnetic random access memory), a flash memory (Flash Memory), a magnetic surface memory, a CD-ROM, or a compact disc read-only memory (CD-ROM, Compact Disc read-only memory); a magnetic surface memory can be a disc memory or a tape memory. A volatile memory may be a random access memory (RAM), and is used as an external cache. With exemplary but not restrictive descriptions, many forms of RAM are available, such as a static random access memory (SRAM, Static Random Access Memory), a synchronous static random access memory (SSRAM, Synchronous static Random Access Memory), a dynamic random access memory (DRAM, Dynamic Random Access Memory), a synchronous dynamics random access memory (SDRAM, Synchronous Dynamics Random Access Memory), a double data rate synchronous dynamic random access memory (DDRS-DRAM, Double Data Rate Synchronous dynamic Random Access Memory), an enhanced synchronous dynamic random access memory (ESDRAM, Enhanced Synchronous dynamic Random Access Memory), a synlink dynamic random access memory (SLDRAM, SyncLink dynamic Random Access Memory), and a direct Rambus random access memory (DRRAM, Direct Rambus Random Access Memory). The memory 702 described in the embodiment of the present disclosure is intended to include, but is not limited to, these and any other suitable types of the memory.

The method disclosed in the foregoing embodiments of the present disclosure may be applied to the processor 61, or may be implemented by the processor 61. The processor 61 may be an integrated circuit chip having a signal processing capability. In an implementation process, steps in the foregoing methods can be implemented by using a hardware integrated logical circuit in the processor 61, or by using instructions in a form of software. The processor 61 described above can be a general-purpose processor, a DSP, or other programmable logic devices, discrete gate or transistor logic devices, discrete hardware components, and the like. The processor 61 may implement or perform the methods, the steps, and logical block diagrams that are disclosed in the embodiments of the present disclosure. A general-purpose processor can be a microprocessor or any conventional processor. The steps of the method disclosed in the embodiment of the present disclosure can be directly performed by a hardware decoding processor, or can be performed by the combination of hardware and software modules in the decoding processor. The software module can be located in the storage medium, the storage medium is located in the memory 62, and the processor 61 reads the information in the memory 62, and performs the steps of the aforementioned methods in combination with its hardware.

In an exemplary embodiment, a transcoding capability configuration device can be implemented by one or more application specific integrated circuits (ASIC, Application Specific Integrated Circuit), a DSP, a programmable logic device (PLD, Programmable Logic Device), a complex programmable logic device (CPLD, Complex Programmable logic Device), an FPGA, a general-purpose processor, a controller, a microcontroller unit (MCU, Micro Controller Unit), a microprocessor (Microprocessor), or other electronic components, and is configured to perform the aforementioned methods.

An embodiment of the present disclosure further provides a computer-readable storage medium, storing a computer instruction, where when the instruction is executed by a processor, the following steps are performed: separately obtaining capability information reported by at least two terminals, where the capability information includes first transcoding capability data and a service type of a service executed by the at least two terminals, and the at least two terminals belong to a same service group; determining, based on the first transcoding capability data and the service type of each of the at least two terminals, second transcoding capability data satisfying the at least two terminals; and sending the second transcoding capability data to each of the at least two terminals, so that each terminal configures a transcoding parameter based on the second transcoding capability data.

In this embodiment, when the instruction is executed by the processor, the following steps are further performed: determining, based on the first transcoding capability data and preset transcoding capability data of each of the at least two terminals, the second transcoding capability data satisfying each terminal and satisfying the service type.

In an implementation, when the instruction is executed by the processor, the following steps are further performed: when at least two pieces of transcoding capability data satisfy each terminal and satisfy the service type, determining to select the second transcoding capability data from the at least two pieces of transcoding capability data based on a preset decision rule, where the second transcoding capability data enables quality of communication between the at least two terminals to satisfy a preset requirement.

In a first implementation, the first transcoding capability data includes a transcoding capability parameter; and the preset transcoding capability data includes a preset transcoding capability parameter. When the instruction is executed by the processor, the following steps are further performed: determining, based on the transcoding capability parameter of each of the at least two terminals, a first group of transcoding capability parameters satisfying the transcoding capability of each terminal and satisfying the service type; determining a second group of transcoding capability parameters based on the first group of transcoding capability parameters and the preset transcoding capability parameter; and selecting a first transcoding capability parameter satisfying a preset condition from the second group of transcoding capability parameters, and generating the second transcoding capability data based on the first transcoding capability parameter.

In a second implementation, the first transcoding capability data further includes a hardware acceleration parameter associated with the transcoding capability parameter; and the preset transcoding capability data further includes a preset hardware acceleration parameter associated with the preset transcoding capability parameter. When the instruction is executed by the processor, the following steps are further performed: determining, based on the hardware acceleration parameter and the preset hardware acceleration parameter of each of the at least two terminals, a third group of transcoding capability parameters supporting a hardware acceleration capability; determining a fourth group of transcoding capability parameters based on the second group of transcoding capability parameters and the third group of transcoding capability parameters; and selecting a second transcoding capability parameter satisfying a preset condition from the fourth group of transcoding capability parameters, and generating the second transcoding capability data based on the second transcoding capability parameter.

In a third implementation, the first transcoding capability data further includes: a first parameter representing a transcoding capability of a corresponding terminal. When the instruction is executed by the processor, the following steps are further performed: determining a lowest value of the first parameter of each terminal, and determining a maximum transcoding performance parameter corresponding to the lowest value; and generating the second transcoding capability data based on the second transcoding capability parameter and the maximum transcoding performance parameter.

In the several embodiments provided in this application, it should be understood that the disclosed device and method may be implemented in other manners. The described device embodiments are merely exemplary. For example, the unit division is merely logical function division and may be other division during actual implementation. For example, multiple units or components may be merged or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in the same place, or may be distributed to many network units. Some or all of the units need to be selected according to actual requirements to implement the purpose of the solution of the embodiments.

In addition, functional units in the embodiments of the present disclosure may be all integrated in a second processing unit, each unit is separately used as a unit, or two or more units are integrated in a unit. The integrated unit may be implemented in a form of hardware, or may be implemented in form of hardware plus a software functional unit.

A person of ordinary skill in the art may understand that all or some of the steps of the foregoing method embodiments may be implemented by a program instructing relevant hardware. The foregoing program may be stored in a computer readable storage medium. When the program runs, the steps of the foregoing method embodiments are performed. The foregoing storage medium includes: any medium that can store program code, such as a mobile storage device, a ROM, a RAM, a magnetic disk, or an optical disc.

Alternatively, when the integrated module in the present disclosure is implemented in the form of a software function module and sold or used as an independent product, the integrated module may be stored in a computer readable storage medium. Based on such an understanding, the technical solutions of the embodiments of the present disclosure essentially, or the part contributing to the existing technology may be implemented in a form of a software product. The computer software product is stored in a storage medium and includes several instructions for instructing a computer device (which may be a personal computer, a server, a network device, or the like) to perform all or some of the methods described in the embodiments of the present disclosure. The foregoing storage medium includes: any media that can store program code, such as a portable storage device, a ROM, a RAM, a magnetic disk, or a compact disc.

The descriptions are only specific implementations of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A transcoding capability configuration method performed at a transcoding capability configuration device having one or more processors and memory storing a plurality of programs to be executed by the one or more processors, wherein the transcoding capability configuration device is configured to select a coding scheme for at least two terminals to set up direct communication with each other in a service, the method comprising:
 obtaining respective transcoding capability information reported by each of the at least two terminals, wherein the respective transcoding capability information comprises respective first transcoding capability data indicating one or more coding schemes supported by the respective terminal, the first transcoding capability data further including a hardware acceleration parameter indicating transcoding capability of the terminal, a preset transcoding capability preferably parameter supported by the terminal, and a preset hardware acceleration parameter associated with the preset transcoding capability parameter, and a service type of a service to be executed by the at least two terminals, wherein the service type includes a video encoding service type and a video decoding service type;
 determining, based on the respective first transcoding capability data and the service type of each of the at least two terminals, second transcoding capability data, wherein the second transcoding capability data indicates a coding scheme with a highest compression efficiency of one or more common coding schemes supported by each of the at least two terminals for the service type, further including:
  determining, based on the transcoding capability parameter of each of the at least two terminals, a first group of transcoding capability parameters satisfying transcoding capability of each terminal and the service type;
  determining a second group of transcoding capability parameters based on the first group of transcoding capability parameters and the preset transcoding capability parameter;
  selecting a first transcoding capability parameter satisfying a preset condition from the second group of transcoding capability parameters;
  after determining the second group of transcoding capability parameters based on the first group of transcoding capability parameters and the preset transcoding capability parameter:
   determining, based on the hardware acceleration parameter and the preset hardware acceleration parameter of each of the at least two terminals, a third group of transcoding capability parameters supporting a hardware acceleration capability;
   determining a fourth group of transcoding capability parameters based on the second group of transcoding capability parameters and the third group of transcoding capability parameters;
   selecting a second transcoding capability parameter satisfying the preset condition from the fourth group of transcoding capability parameters; and
   generating the second transcoding capability data based on the first transcoding capability parameter and the second transcoding capability parameter;
 sending the second transcoding capability data to each of the at least two terminals, so that each terminal configures a transcoding parameter based on the second transcoding capability data and starts the service using the transcoding parameter; and
 causing the at least two terminals to set up the direct communication with each other.

2. The method according to claim 1, wherein the determining the second transcoding capability data satisfying each terminal and satisfying the service type comprises:
 when at least two pieces of transcoding capability data satisfy each terminal and satisfy the service type, selecting the second transcoding capability data from the at least two pieces of transcoding capability data based on a preset decision rule, wherein the second transcoding capability data enables quality of communication between the at least two terminals to satisfy a preset requirement.

3. The method according to claim 1, wherein the first transcoding capability data further comprises a first parameter, and the first parameter represents a transcoding capability of a corresponding terminal;
 the method further comprises:
 before generating the second transcoding capability data based on the second transcoding capability parameter:
  determining a lowest value of the first parameter of each terminal;
  determining a maximum transcoding performance parameter corresponding to the lowest value; and
  generating the second transcoding capability data based on the second transcoding capability parameter and the maximum transcoding performance parameter.

4. A transcoding capability configuration device, comprising one or more processors, memory coupled to the one or more processors and a plurality of programs stored in the memory that, when executed by the one or more processors, wherein the transcoding capability configuration device is configured to select a coding scheme for at least two terminals to set up direct communication with each other in a service, cause the transcoding capability configuration device to perform operations including:
 obtaining respective transcoding capability information reported by each of the at least two terminals, wherein the respective transcoding capability information comprises respective first transcoding capability data indicating one or more coding schemes supported by the respective terminal, the first transcoding capability data further including a hardware acceleration parameter indicating transcoding capability of the terminal, a preset transcoding capability preferably parameter supported by the terminal, and a preset hardware acceleration parameter associated with the preset transcoding capability parameter, and a service type of a service to be executed by the at least two terminals, wherein the service type includes a video encoding service type and a video decoding service type;

determining, based on the respective first transcoding capability data and the service type of each of the at least two terminals, second transcoding capability data, wherein the second transcoding capability data indicates a coding scheme with a highest compression efficiency of one or more common coding schemes supported by each of the at least two terminals for the service type, further including:

determining, based on the transcoding capability parameter of each of the at least two terminals, a first group of transcoding capability parameters satisfying transcoding capability of each terminal and the service type;

determining a second group of transcoding capability parameters based on the first group of transcoding capability parameters and the preset transcoding capability parameter;

selecting a first transcoding capability parameter satisfying a preset condition from the second group of transcoding capability parameters;

after determining the second group of transcoding capability parameters based on the first group of transcoding capability parameters and the preset transcoding capability parameter:

determining, based on the hardware acceleration parameter and the preset hardware acceleration parameter of each of the at least two terminals, a third group of transcoding capability parameters supporting a hardware acceleration capability;

determining a fourth group of transcoding capability parameters based on the second group of transcoding capability parameters and the third group of transcoding capability parameters;

selecting a second transcoding capability parameter satisfying the preset condition from the fourth group of transcoding capability parameters; and generating the second transcoding capability data based on the first transcoding capability parameter and the second transcoding capability parameter;

sending the second transcoding capability data to each of the at least two terminals, so that each terminal configures a transcoding parameter based on the second transcoding capability data and starts the service using the transcoding parameter; and causing the at least two terminals to set up the direct communication with each other.

5. The transcoding capability configuration device according to claim 4, wherein the determining the second transcoding capability data satisfying each terminal and satisfying the service type comprises:

when at least two pieces of transcoding capability data satisfy each terminal and satisfy the service type, selecting the second transcoding capability data from the at least two pieces of transcoding capability data based on a preset decision rule, wherein the second transcoding capability data enables quality of communication between the at least two terminals to satisfy a preset requirement.

6. The transcoding capability configuration device according to claim 4, wherein the first transcoding capability data further comprises a hardware acceleration parameter associated with the transcoding capability parameter; and the preset transcoding capability data further comprises a preset hardware acceleration parameter associated with the preset transcoding capability parameter; and the operations further comprise:

after determining a second group of transcoding capability parameters based on the first group of transcoding capability parameters and the preset transcoding capability parameter:

determining, based on the hardware acceleration parameter and the preset hardware acceleration parameter of each of the at least two terminals, a third group of transcoding capability parameters supporting a hardware acceleration capability;

determining a fourth group of transcoding capability parameters based on the second group of transcoding capability parameters and the third group of transcoding capability parameters; and selecting a second transcoding capability parameter satisfying a preset condition from the fourth group of transcoding capability parameters, and generating the second transcoding capability data based on the second transcoding capability parameter.

7. The transcoding capability configuration device according to claim 6, wherein the first transcoding capability data further comprises a first parameter, and the first parameter represents a transcoding capability of a corresponding terminal;

the operations further comprise:

before generating the second transcoding capability data based on the second transcoding capability parameter:

determining a lowest value of the first parameter of each terminal;

determining a maximum transcoding performance parameter corresponding to the lowest value; and generating the second transcoding capability data based on the second transcoding capability parameter and the maximum transcoding performance parameter.

8. A non-transitory computer readable storage medium storing a plurality of machine readable instructions in connection with a transcoding capability configuration device having one or more processors, wherein the transcoding capability configuration device is configured to select a coding scheme for at least two terminals to set up direct communication with each other in a service, and wherein the plurality of machine readable instructions, when executed by the one or more processors, cause the transcoding capability configuration device to perform operations including:

obtaining respective transcoding capability information reported by each of the at least two terminals, wherein the respective transcoding capability information comprises respective first transcoding capability data indicating one or more coding schemes supported by the respective terminal, the first transcoding capability data further including a hardware acceleration parameter indicating transcoding capability of the terminal, a preset transcoding capability preferably parameter supported by the terminal, and a preset hardware acceleration parameter associated with the preset transcoding capability parameter, and a service type of a service to be executed by the at least two terminals, wherein the service type includes a video encoding service type and a video decoding service type;

determining, based on the respective first transcoding capability data and the service type of each of the at least two terminals, second transcoding capability data, wherein the second transcoding capability data indicates a coding scheme with a highest compression efficiency of one or more common coding schemes supported by each of the at least two terminals for the service type, further including:
  determining, based on the transcoding capability parameter of each of the at least two terminals, a first group of transcoding capability parameters satisfying transcoding capability of each terminal and the service type;
  determining a second group of transcoding capability parameters based on the first group of transcoding capability parameters and the preset transcoding capability parameter;
  selecting a first transcoding capability parameter satisfying a preset condition from the second group of transcoding capability parameters;
  after determining the second group of transcoding capability parameters based on the first group of transcoding capability parameters and the preset transcoding capability parameter:
    determining, based on the hardware acceleration parameter and the preset hardware acceleration parameter of each of the at least two terminals, a third group of transcoding capability parameters supporting a hardware acceleration capability;
    determining a fourth group of transcoding capability parameters based on the second group of transcoding capability parameters and the third group of transcoding capability parameters;
    selecting a second transcoding capability parameter satisfying the preset condition from the fourth group of transcoding capability parameters; and
  generating the second transcoding capability data based on the first transcoding capability parameter and the second transcoding capability parameter;
  sending the second transcoding capability data to each of the at least two terminals, so that each terminal configures a transcoding parameter based on the second transcoding capability data and starts the service using the transcoding parameter; and
  causing the at least two terminals to set up the direct communication with each other.

9. The non-transitory computer readable storage medium according to claim 8, wherein the determining the second transcoding capability data satisfying each terminal and satisfying the service type comprises:
  when at least two pieces of transcoding capability data satisfy each terminal and satisfy the service type, selecting the second transcoding capability data from the at least two pieces of transcoding capability data based on a preset decision rule, wherein the second transcoding capability data enables quality of communication between the at least two terminals to satisfy a preset requirement.

10. The non-transitory computer readable storage medium according to claim 8, wherein the first transcoding capability data further comprises a hardware acceleration parameter associated with the transcoding capability parameter; and the preset transcoding capability data further comprises a preset hardware acceleration parameter associated with the preset transcoding capability parameter; and
  the operations further comprise:
  after determining a second group of transcoding capability parameters based on the first group of transcoding capability parameters and the preset transcoding capability parameter:
    determining, based on the hardware acceleration parameter and the preset hardware acceleration parameter of each of the at least two terminals, a third group of transcoding capability parameters supporting a hardware acceleration capability;
    determining a fourth group of transcoding capability parameters based on the second group of transcoding capability parameters and the third group of transcoding capability parameters; and
    selecting a second transcoding capability parameter satisfying a preset condition from the fourth group of transcoding capability parameters, and generating the second transcoding capability data based on the second transcoding capability parameter.

11. The non-transitory computer readable storage medium according to claim 10, wherein the first transcoding capability data further comprises a first parameter, and the first parameter represents a transcoding capability of a corresponding terminal;
  the operations further comprise:
  before generating the second transcoding capability data based on the second transcoding capability parameter:
    determining a lowest value of the first parameter of each terminal;
    determining a maximum transcoding performance parameter corresponding to the lowest value;
    generating the second transcoding capability data based on the second transcoding capability parameter and the maximum transcoding performance parameter; and
  obtain transcoding capability information reported by at least two terminals.

* * * * *